United States Patent
Becker et al.

(10) Patent No.: US 8,460,114 B2
(45) Date of Patent: Jun. 11, 2013

(54) ROTARY ELASTIC COUPLING AND ITS METHOD OF MANUFACTURE

(75) Inventors: Markus K. Becker, Dortmund (DE); Peter Frohs, Velbert (DE); Maik Marcinkowski, Bochum (DE); Michael Holzapfel, Heidenheim (DE); Michael Bachmann, Heidenheim (DE); Michael Jaros, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 12/937,332

(22) PCT Filed: Apr. 9, 2009

(86) PCT No.: PCT/EP2009/002626
§ 371 (c)(1),
(2), (4) Date: Jan. 19, 2011

(87) PCT Pub. No.: WO2009/124758
PCT Pub. Date: Oct. 15, 2009

(65) Prior Publication Data
US 2011/0165950 A1   Jul. 7, 2011

(30) Foreign Application Priority Data
Apr. 11, 2008   (DE) .......................... 10 2008 018 349

(51) Int. Cl.
*F16D 3/76*   (2006.01)
*B05D 3/00*   (2006.01)

(52) U.S. Cl.
USPC .................. 464/75; 464/89; 29/451; 29/458; 29/525.01; 29/527.2

(58) Field of Classification Search
USPC ................ 464/71, 73, 74, 75, 87, 89; 29/451, 29/458, 525.01, 527.2
See application file for complete search history.

(56) References Cited

U.S. PATENT DOCUMENTS

| 2,363,469 A | 11/1944 | Goldschmidt |
| 2,466,218 A * | 4/1949 | Farrell et al. .................... 464/75 |

(Continued)

FOREIGN PATENT DOCUMENTS

| DE | 1575892 | 7/1970 |
| DE | 2532845 A1 | 1/1977 |

(Continued)

OTHER PUBLICATIONS

Shigley, Mischke, & Budynas, Mechanical Engineering Design, 2003, McGraw-Hill, Seventh Edition, p. 396.*

(Continued)

*Primary Examiner* — Gregory Binda
*Assistant Examiner* — Matthieu Setliff
(74) *Attorney, Agent, or Firm* — Taylor IP, P.C.

(57) ABSTRACT

A rotary elastic coupling is fitted with an inner ring and with an outer ring surrounding the inner ring around the periphery by forming an annular slit. An elastomer is provided in the annular slit, which is vulcanized or glued to the inner ring and to the outer ring and fills up the annular slit substantially or completely. The annular slit is meander-shaped around the periphery of the coupling so that radially outward protrusions of the inner ring undercut radially inward protrusions of the outer ring. Around the periphery of the coupling, a relief opening is provided in the elastomer on both sides of the protrusions of the inner ring and on both sides of the protrusions of the outer ring.

24 Claims, 2 Drawing Sheets

U.S. PATENT DOCUMENTS

| | | | | |
|---|---|---|---|---|
| 2,891,394 A | * | 6/1959 | Goloff et al. | 464/75 X |
| 4,793,455 A | * | 12/1988 | Tabuchi et al. | 464/89 X |
| 5,672,111 A | | 9/1997 | Schremmer et al. | |

FOREIGN PATENT DOCUMENTS

| | | |
|---|---|---|
| DE | 2733880 A1 | 7/1977 |
| DE | 3403910 A1 | 8/1985 |
| DE | 3716941 A1 | 11/1987 |
| DE | 3822637 C2 | 1/1990 |
| DE | 19515103 A1 | 7/1996 |
| DE | 19639304 B4 | 3/1998 |
| DE | 19958367 A1 | 12/1999 |
| DE | 102004051340 A1 | 6/2006 |
| FR | 11282208 | 1/1957 |
| FR | 1416203 | 9/1965 |
| GB | 538625 | 8/1941 |

OTHER PUBLICATIONS

International Preliminary Report on Patentability for International Application Serial No. PCT/EP2009/002626.

* cited by examiner

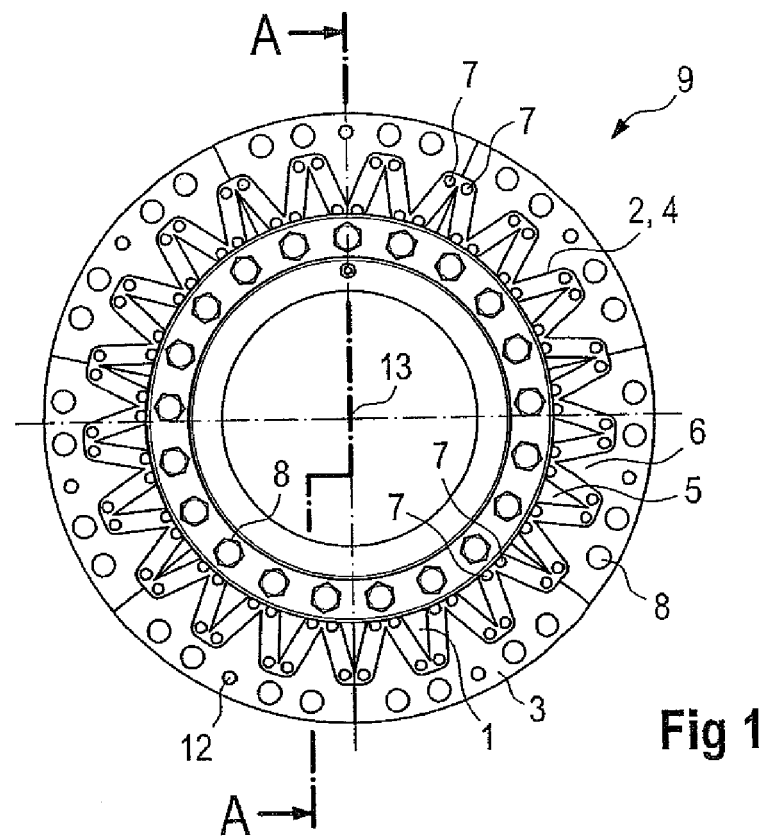
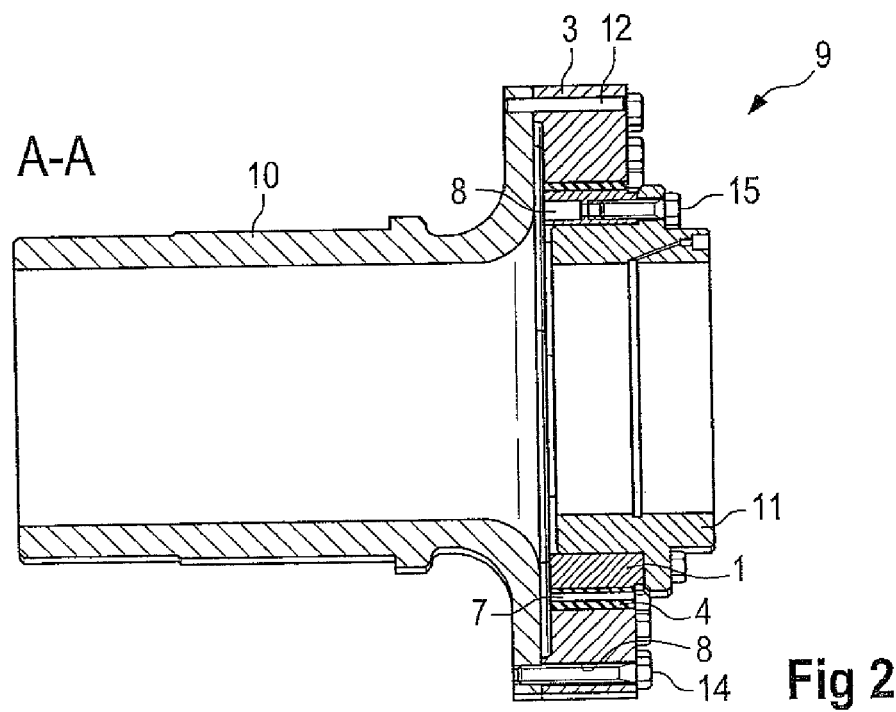

ROTARY ELASTIC COUPLING AND ITS METHOD OF MANUFACTURE

BACKGROUND OF THE INVENTION

1. Field of the Invention

The present invention relates to a rotary elastic coupling, in particular for a track vehicle drive train, for instance in the drive connection between a drive motor and a transmission or between the transmission and the drive wheels, in particular a wheel set shaft.

2. Description of the Related Art

Until now, drive trains for track vehicles, in particular the drive connection between the transmission output shaft and the wheel set shaft, have used so-called wedge pack couplings. Such wedge pack couplings are disclosed for instance in the following documents: DE 34 03 910 A1; DE 196 39 304 B4; and DE 199 58 367 A1.

Such wedge pack couplings are capable of transmitting very high torques of, for example, a few hundred to more than one thousand Newton meters and of compensating for a certain axial, radial or angular offset between the components, in particular shafts which are connected fixedly to the coupling. This results in a combination of high torsion resistance with simultaneously satisfactory axial, radial and angular displacement capacity. At the same time, the couplings should provide a comparatively high centering force for self-centering both connected components or shafts.

The wedge pack couplings include two coupling stars, between which wedge-shaped rubber elements are integrated with undercutting arms in a radial direction in order to transmit a force around the periphery. To be able to transmit high forces, respectively high torques, the rubber elements are also often prestressed between both enclosing arms.

Although the known wedge pack couplings, in particular in track vehicle drive trains or other motor vehicle drive trains, operate reliably, they have the shortcoming of being comparatively more expensive to produce.

To describe other state of the art technologies apart from wedge pack couplings as they are installed in track vehicle drive trains, reference is made to publication DE 195 15 103 A1, which illustrates a multi-wedge shaft connection with two tubes which axially rotate relative to one another and are supported elastically against one another by an elastomer. Moreover, patent document DE 38 22 637 C2 describes an elastic non-rotating shaft hub connection, and publication DE 1 575 892 A relates to an elastic coupling with individual rubber elements inlaid between protrusions on an inner portion and protrusions on an outer portion. Finally publication DE 10 2004 051 340 A1 shows a drive train, in particular for vehicles, wherein a wire cushion is inserted between two tubes, to obtain a relatively flat characteristic in a first angular region where both tubes are relatively twisted before the relatively flat characteristic progresses considerably in a given region.

What is needed in the art is a rotary elastic coupling, in particular for a vehicle drive train, for instance a track vehicle drive train, which includes at least the same high torsion resistance with simultaneously satisfactory axial, radial and angular displacement capacity of both coupling sections as previous wedge pack couplings, but which can be manufactured at significantly lower cost. Further a method for inexpensively and efficiently manufacturing such a rotary elastic coupling is needed.

SUMMARY OF THE INVENTION

The present invention provides a rotary elastic coupling including an inner ring and an outer ring. The outer ring encloses the inner ring around the periphery so that an annular slit is formed between the inner ring and the outer ring, more precisely between the radially outer periphery of the inner ring and the radially inner periphery of the outer ring. Generally, the annular slit extends over 360 degrees, which means that the inner ring and the outer ring never touch each other along their periphery.

An elastomer according to the present invention is provided in the annular slit, which is vulcanized or glued to the inner ring and to the outer ring and fills up the annular slit substantially or completely. The annular slit is meander-shaped so that radially outward protrusions of the inner ring undercut radially inward protrusions of the outer ring. This means that when a torque is applied to the inner ring or the outer ring, the torque is transmitted via the resulting elastic compressive forces which move the protrusions of the inner ring and of the outer ring around the periphery against one another, as well as via elastic shear forces inside the elastomer and between the elastomer and the inner ring and the elastomer and the outer ring and, to a certain extent, via elastic tensile forces between the inner ring and the outer ring.

According to the present invention, at least one relief opening, for example one relief opening, is provided around the periphery of the coupling in the elastomer on both sides of the protrusions of the inner ring and on both sides of the protrusions of the outer ring. The designation of relief opening could be replaced with the concept of relief recess, whereas the recesses, respectively the openings, may come in a great number of shapes, for instance a passage opening reaching completely into the elastomer or a blind hole with only one open end on one face. The relief openings, which may have a circular section, for example, a cylindrical shape, reduce on the one hand any notch effect in the elastomer on the tips of the protrusions of the inner ring and of the outer ring and also prevent the elastomer from creeping out of the pressure areas between the protrusions over the protrusions. Hereby, contrary to a coupling with a elastomer between an inner ring and an outer ring with undercutting protrusions where the elastomer has no such relief openings on both sides of the protrusions, the coupling can be used for transmitting particularly high torques and still provide a long lifetime thanks to extremely minimal wear, let alone extremely low fatigue.

The relief openings are, for example, arranged in immediate proximity of each free end of every protrusion around the periphery on each side of the protrusion. For example, a single relief opening can be provided on each side. Arranging the relief openings close to the end of the protrusions efficiently prevents any creeping of the elastomer over the protrusions.

The relief openings can be positioned in immediate proximity of the free ends of the protrusions, for instance in the area of the tip of a triangle, however on both sides of the tip, in a such a way that the relief openings are placed substantially radially inside the radially inner protrusions and radially outside the radially outward protrusions. Alternately, the relief openings can be positioned on the corresponding radius, namely on the inner radius of the radially inward protrusions and on the outer radius of the radially outward protrusions.

According a first embodiment of the present invention, the inner ring and the outer ring are attached to one another exclusively via the elastomer and consequently connected elastically to one another around the periphery in a radial direction and in an axial direction so as to provide an angular displacement capacity between inner ring and outer ring. The elastomer does not, for example, include any integrated wire mesh and may constitute the only material between the inner ring and the outer ring.

The relief openings may be completely surrounded by the elastomer, contrary to edge-open apertures openings, which are at least partially surrounded by the material of the inner ring or of the outer ring.

Since the relief openings are provided on both sides of the protrusions, the protrusions can be dented on the inner ring and/or on the outer ring, for example, each in the form of an acute triangle, for instance with linear sides. The line of symmetry of such a triangle, which is, for example, isosceles, may run in a radial direction of the rotary elastic coupling. Such an acute triangle, may however, be tilted with respect to the radial direction of the rotary elastic coupling, whereas normally identical side lengths are replaced with different side lengths.

The inner ring and/or the outer ring may include on the side facing away from the elastomer a circular periphery, for example a cylindrical periphery. Consequently, the cylindrical outer periphery of the outer ring and/or the cylindrical inner periphery of the inner ring according to a second embodiment of the present invention presents a constant diameter or a substantially constant diameter.

The inner ring as well as the outer ring, may consist of a single part. The inner ring and/or the outer ring may also consist of individual adjoining ring segments. If the outer ring presents a relatively large diameter, segmentation may prove advantageous during manufacture.

The rotary elastic coupling may be made in a such a way that connection surfaces are provided for both components to be linked, arranged on one or both front sides of the rotary elastic coupling and extend, for example, vertically to the rotational axis, respectively the central axis, of the rotary elastic coupling. So for instance, a first axially oriented front side may form a torque-proof connection with a first shaft or other connecting element and the second opposite axially oriented front side may form a torque-proof connection with a second shaft or other connecting element. To do so, connecting bores may be provided in the connection surfaces, which enable to axially flange the shafts to be connected or other connecting elements to the rotary elastic coupling. The bores run, for example, parallel to the rotational axis, for example the central axis, of the rotary elastic coupling and the front sides are, for example, parallel relative to one another.

The rotary elastic coupling, according to a manufacturing process of the present invention, provides for the production of the entire inner ring and the entire outer ring, or in the case of segmented embodiments, the various ring segments separately from one another. By "produced separately from one another", it is meant that the inner ring and the outer ring are provided as individual parts not connected with one another.

After manufacture, the inner ring and the outer ring are positioned concentrically to form the annular slit and so that protrusions undercut one another radially outwardly on the inner ring and radially inwardly on the outer ring. The positioning may be such that the inner ring and the outer ring never touch each other.

Before positioning, the outer ring may be provided with a bonding agent on its radially inner periphery, respectively on its radially inner surface, and the inner ring provided with a bonding agent on its radially outer periphery, respectively on its radially outer surface. The bonding agent can primers, standard paints, coatings or similar substances applied to the surface. The bonding of the elastomer to the surface can also be improved using structural measures on the surface.

A preset number of pins, for example cylindrical pins, are provided whose outer surface is exempt of any bonding agent, i.e. whose surface is such that the elastomer does not adhere (or at least less) to the surface of the inner ring and of the outer ring against the cylindrical pin surface. Here, "pin" is meant to be any appropriate form of retaining device.

The annular slit is filled with an elastomer after positioning the inner ring and outer ring and before assembly of the surface coated with a bonding agent on the inner ring and outer ring or respectively an elastomer is injected in the annular slit or inserted in another way, whereas the pins are introduced in the elastomer before it has hardened or set. The pins can be inserted before the casting, respectively injecting process or other insertion process, during casting/injecting/insertion or after casting/injecting/insertion, for example, immediately after casting/injecting/insertion.

The elastomer can be hardened (set) by heating, for example baking the elastomer. Usually, the inner ring, the outer ring, the elastomer and the pins are heated, respectively baked together.

After heating and usually after consecutive cooling, the centering bores can be placed in the inner ring and/or the outer ring, in which centering pins can then be inserted. Alternately or additionally, the centering pins can be assembled on the inner ring and/or on the outer ring using other measures. The centering bores, respectively the centering pins, serve then for centering the rotary elastic coupling on the shafts or connecting elements which are connected with one another elastically via the rotary elastic coupling.

An advantage of inserting the centering bores, respectively the assembly of centering pins, only after heating the rotary elastic coupling to fasten the elastomer lies in that an out-of-balance may be generated in the rotary elastic coupling during the heating process, respectively during a subsequent cooling process. With rotation symmetric components such as the rotary elastic coupling according to an embodiment of the present invention, the centering usually takes place on a connecting element, in such a way that the component, respectively the coupling, is fitted with a centering collar which can be provided for instance by cutting and turning on the lathe (turning off). According to a further embodiment of the present invention, the rotary elastic coupling or at least the outer ring or the inner ring is exempt of any centering collar and centering is only provided by the centering pins.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 shows a front elevation view of an embodiment according to the present invention of a rotary elastic coupling;

FIG. 2 shows an axial section through the rotary elastic coupling according to FIG. 1;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 3:
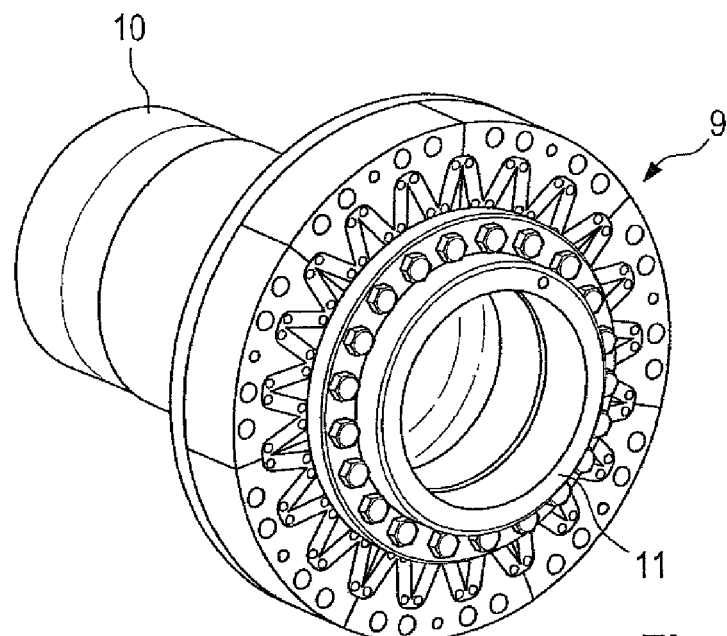
FIG. 3 shows a three-dimensional elevation view of the rotary elastic coupling according to FIG. 1.

Referring now to the drawings, and more particularly to FIG. 1, there is shown rotary elastic coupling 9, includes inner ring 1 as well as outer ring 3, wherein inner ring 1 and outer ring 2 are segmented around the periphery. Seven segments are present around the periphery. It goes without saying that another number of segments is quite possible.

Inner ring 1 presents radially outward protrusions 5 and outer ring 3 presents radially inward protrusions 6. Protrusions 5, 6 are dented with a tip on the radially outer end. Inner ring 1 and outer ring 3 delineate together a meander-shaped annular slit 2, which is completely filled with a elastomer 4, with the exception of relief openings 7 integrated in elastomer 4. As can be seen, single relief opening 7, in the form of a cylindrical opening, is provided in immediate proximity of each free end, respectively each tip, of every protrusion 5, 6 around the periphery on every side of protrusions 5, 6. In spite of the provision of such relief openings 7, the whole inner periphery of outer ring 3 and the whole outer periphery of inner ring 1 are connected at least via a preset axial section with elastomer 4.

The connection between inner ring 1, outer ring 3 and elastomer 4 is an undetachable connection, i.e. such connection can only be broken by tearing or destroying elastomer 4.

Inner ring 1 as well as outer ring 3 exhibit parallel to rotational axis 13 a great number of connecting bores 8, for flanging to components to be connected using the rotary elastic coupling 9.

Referring now to FIG. 2, there is shown, in addition to previously described elements, first shaft 10 and second shaft 11 connected together via rotary elastic coupling 9. First shaft 10 is assembled via flange bolting connection 14, wherein the screws run through connecting bores 8, frontally on outer ring 3. Outer ring 3 is centered with first shaft 11 using a great number of centering pins 12, which can also be seen in FIG. 1, whereas a single centering pin 12 is provided for each segment in the illustrated embodiment.

Second shaft 11 is also screwed via a flange bolting connection frontally on inner ring 1. See screws 15 which are inserted in threaded connecting bores 8 in inner ring 1. Second shaft 11 is consequently mounted frontally on rotary elastic coupling 9. A collar of second shaft 11 reaches axially into inner ring 1 and carries inner ring 1 on its outer periphery. Hereby, centering can be provided between inner ring 1 and second shaft 11, which dispenses with centering pins between second shaft 11 and inner ring 1.

It goes without saying that centering can be provided in the connection between inner ring 1 and second shaft 11 alternatively or additionally to the illustrated centering collar.

Referring now to FIG. 3, there is shown another three-dimensional view of rotary elastic coupling 9 with both shafts 10 and 11 connected thereto.

Figure 4:
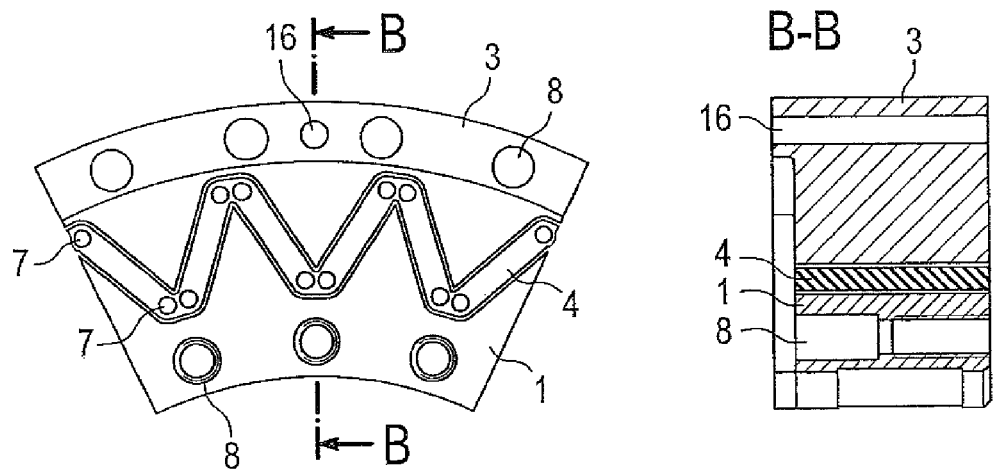
FIG. 4 shows an axial elevation view of a segment of the rotary elastic coupling, including an inner ring segment, an outer ring segment and the elastomer integrated between said elements, as well as an axial section through the segment.

FIG. 4 shows a segment of the rotary elastic coupling, including a segment of outer ring 3, of inner ring 1, as well as elastomer 4 provided therebetween, with relief openings 7, in the condition before connecting shafts. Besides, connecting bores 8 can be seen in threaded inner ring 1 and in outer ring 3 which is exempt of thread. Centering bore is provided around the periphery in the center of every segment of outer ring 3 for inserting the centering pin.

As can be seen, relief openings 7 are relatively small in diameter, namely smaller than the diameter of connecting bores 8 and centering bores 16. They are each surrounded completely with elastomer 4.

The invention claimed is:

1. A rotary elastic coupling comprising:
an inner ring including a plurality of radially outward protrusions;
an outer ring surrounding said inner ring around a periphery of said inner ring and including a plurality of radially inward protrusions, said radially outward protrusions of said inner ring undercutting said radially inward protrusions to form a meander-shaped annular slit around a periphery of the coupling; and
an elastomer included in said annular slit, said elastomer being one of vulcanized and glued to said inner ring and said outer ring and filling up said annular slit one of substantially and completely, said elastomer including a relief opening around said periphery of the coupling on both sides of said radially outward protrusions of said inner ring, said relief opening positioned one of radially outside said radially outward protrusions and on an outer radius of said radially outward protrusions, an additional relief opening located around said periphery of said coupling on both sides of said radially inward protrusions of said outer ring, said additional relief opening including a first said additional relief opening positioned on one of said sides of a respective one of said radially inward protrusions and a second said additional relief opening positioned on another of said sides of said respective one of said radially inward protrusions, said additional relief opening being positioned one of radially inside of a radially inner-most radius of said radially inward protrusions and on said radially inner-most radius of said radially inward protrusions.

2. The rotary elastic coupling according to claim 1, wherein a single relief opening is arranged in immediate proximity of each free end of each of said inward protrusions and said outward protrusions around said periphery of the coupling on each side of said inward protrusions and said outward protrusions.

3. The rotary elastic coupling according to claim 2, wherein said inner ring and said outer ring are attached to each other exclusively with said elastomer and are connected elastically to one another around said periphery in a radial direction and an axial direction.

4. The rotary elastic coupling according to claim 1, wherein said relief openings are completely surrounded by said elastomer.

5. The rotary elastic coupling according to claim 1, wherein said relief openings have a circular section.

6. The rotary elastic coupling according to claim 5, wherein said relief openings are cylindrical in shape.

7. The rotary elastic coupling according to claim 1, wherein at least one of said protrusions of said inner ring and said protrusions of said outer ring are one dented and tilted to form an acute triangle in a radial direction.

8. The rotary elastic coupling according to claim 1, wherein at least one of said ring having one of a circular and a cylindrical outer periphery and said inner ring having one of a circular and a cylindrical outer periphery includes individual ring segments.

9. The rotary elastic coupling according to claim 8, wherein said individual ring segments are one of same-sized and identical.

10. The rotary elastic coupling according to claim 9, wherein at least one of said outer ring and said inner ring includes a plurality of connecting bores ending in an axially oriented front for torque proof connection of one of a shaft and another connecting element and is parallel to a rotational axis of the rotary elastic coupling.

11. A shaft connection comprising:
a rotary elastic coupling including an inner ring including a plurality of radially outward protrusions and an outer ring surrounding said inner ring around a periphery of said inner ring and including a plurality of radially inward protrusions, said radially outward protrusions of said inner ring undercutting said radially inward protrusions to form a meander-shaped annular slit between said inner ring and said outer ring and an elastomer included in said annular slit, said elastomer being one of vulcanized and glued to said inner ring and said outer ring and filling up said annular slit one of substantially and completely, said elastomer including a relief opening on both sides of each of said protrusions of said inner ring and on both sides of said protrusions of said outer ring, said relief opening on both sides of said protrusions of said outer ring including a first said relief opening positioned on one of said sides of a respective one of said radially inward protrusions and a second said relief opening positioned on another of said sides of said respective one of said radially inward protrusions;
a first shaft connected in positive engagement with said outer ring; and
a second shaft connected in positive engagement with said inner ring and elastically connected with said first shaft in an axial direction and a radial direction and around a periphery with said rotary elastic coupling.

12. The shaft connection according to claim 11, wherein said first shaft is screwed with said outer ring and said second shaft is screwed with said inner ring.

13. The shaft connection according to claim 12, wherein said first shaft is flanged frontally on said outer ring and said second shaft is flanged frontally on said inner ring.

14. The shaft connection according to claim 13, wherein said second shaft is flanged frontally on said inner ring on a front side axially opposed to said first shaft.

15. The shaft connection according to claim 13, wherein at least one of said first shaft flanged to said outer ring and said second shaft flanged to said inner ring is centered without a centering collar with said rotary elastic coupling.

16. The shaft connection according to claim 15, wherein at least one of said first shaft flanged to said outer ring and said second shaft flanged to said inner ring is centered with centering pins.

17. A drive train comprising:
a rotary elastic coupling including an inner ring including a plurality of radially outward protrusions and an outer ring surrounding said inner ring around a periphery of said inner ring and including a plurality of radially inward protrusions, said radially outward protrusions of said inner ring undercutting said radially inward protrusions to form a meander-shaped annular slit between said inner ring and said outer ring and an elastomer included in said annular slit, said elastomer being one of vulcanized and glued to said inner ring and said outer ring and filling up said annular slit one of substantially and completely, said elastomer including a relief opening on both sides of each of said protrusions of said inner ring and on both sides of said protrusions of said outer ring, said relief opening on both sides of said protrusions of said outer ring including a first said relief opening positioned on one of said sides of a respective one of said radially inward protrusions and a second said relief opening positioned on another of said sides of said respective one of said radially inward protrusions, said first relief opening and said second relief opening each being positioned one of radially inside of a radially inner-most radius of said radially inward protrusions and on said radially inner-most radius of said radially inward protrusions;
a first shaft connected in positive engagement with said outer ring;
a second shaft connected in positive engagement with said inner ring and elastically connected with said first shaft in an axial direction and a radial direction and around a periphery with said rotary elastic coupling to form a shaft connection;
a drive machine;
a plurality of drive wheels configured to be driven with said drive machine; and
a drive connection houses said shaft connection, said shaft connection being between said drive machine and said drive wheels.

18. The drive train according to claim 17, wherein the drive train is a vehicle drive train.

19. The drive train according to claim 18, wherein said vehicle drive train is a track vehicle drive train.

20. A method for manufacturing a rotary elastic coupling, the method comprising the steps of:
separately manufacturing an inner ring and an outer ring;
concentrically positioning said inner ring and said outer ring in one another to form an annular slit;
coating said outer ring with a bonding agent on a radially inner periphery;
coating said inner ring with said bonding agent on a radially outer periphery;
preparing a predetermined number of pins having one of a cylindrical and another shape, said pins being exempt of said bonding agent;
filling said annular slit with an elastomer;
placing said pins in said elastomer one of before, during and after a casting process and before said elastomer has hardened;
causing said elastomer to set one of partially and completely; and
removing said pins from said elastomer after said elastomer has hardened.

21. The method according to claim 20, wherein said causing step further comprises heating said inner ring, said outer ring, said elastomer and said pins to set said elastomer.

22. The method according to claim 21, wherein said heating is baking.

23. The method according to claim 22, further comprising the steps, each of which are subsequent to said heating step: cooling the rotary elastic coupling; placing centering bores in at least one of said inner ring and said outer ring; and installing centering pins on at least one of said inner ring and outer ring for centering the rotary elastic coupling during assembly in a drive train.

24. The method according to claim 23, wherein said rotary elastic coupling is installed between two shafts in said drive train during assembly.

* * * * *